(12) United States Patent
Maekawa

(10) Patent No.: US 6,723,772 B2
(45) Date of Patent: Apr. 20, 2004

(54) RESIN COMPOSITION, MOLDED ARTICLE AND LAMINATED PLATE USING THE SAME

(75) Inventor: Tomohiro Maekawa, Niihama (JP)

(73) Assignee: Sumitomo Chemical Company, Limited, Osaka (JP)

(*) Notice: Subject to any disclaimer, the term of this patent is extended or adjusted under 35 U.S.C. 154(b) by 24 days.

(21) Appl. No.: 10/190,831

(22) Filed: Jul. 9, 2002

(65) Prior Publication Data
US 2003/0088001 A1 May 8, 2003

(30) Foreign Application Priority Data
Jul. 12, 2001 (JP) ........................ 2001-211809

(51) Int. Cl.[7] .................................. C08L 5/11
(52) U.S. Cl. ................ 524/314; 524/560; 524/321; 524/230; 524/577; 428/514
(58) Field of Search .............. 524/314, 321, 524/230; 428/524

(56) References Cited

U.S. PATENT DOCUMENTS

| | | | | |
|---|---|---|---|---|
| 3,860,598 A | * | 1/1975 | Rosenkranz et al. | 546/174 |
| 3,943,094 A | * | 3/1976 | Margotte et al. | 524/508 |
| 4,396,678 A | * | 8/1983 | Olson | 428/412 |
| 4,921,726 A | * | 5/1990 | Poole et al. | 427/519 |
| 4,975,478 A | * | 12/1990 | Okuda | 524/86 |
| 5,494,291 A | * | 2/1996 | Kennedy | 473/378 |
| 5,521,051 A | * | 5/1996 | Neumann et al. | 430/269 |
| 6,042,945 A | * | 3/2000 | Maekawa | 428/411.1 |
| 6,433,044 B1 | * | 8/2002 | Maekawa et al. | 524/99 |
| 2003/0088001 A1 | * | 5/2003 | Maekawa | 524/115 |

FOREIGN PATENT DOCUMENTS

| | | | | |
|---|---|---|---|---|
| JP | 7-258166 A | * | 10/1995 | C07C/69/734 |
| JP | 2003-25406 A | * | 1/2003 | B29C/47/00 |

* cited by examiner

*Primary Examiner*—David W. Wu
*Assistant Examiner*—Rip A Lee
(74) *Attorney, Agent, or Firm*—Sughrue Mion, PLLC

(57) ABSTRACT

The present invention provides a resin composition comprising 100 parts by weight of a methyl methacrylate resin or styrene resin, about 0.1 to about 20 parts by weight of a light diffusing agent, about 0.0005 to about 0.1 parts by weight of an ultraviolet absorber selected from the group consisting of 2-(1-arylalkylidene) malonates and oxalanilides, and about 0.0001 to about 0.01 parts by weight of a phosphor. This resin composition is used as a material of a light diffusing member showing excellent light diffusible transmittance, having excellent durability and manifesting suppressed yellowing of transmitted light. Further, a laminated plate obtained using this resin composition is suitably used as a lighting cover, light diffusing plate for liquid crystal displays, illumination sign board or the like for which light transmittance and light diffusing property are required and durability is desired.

5 Claims, No Drawings

RESIN COMPOSITION, MOLDED ARTICLE AND LAMINATED PLATE USING THE SAME

BACKGROUND OF THE INVENTION

1. Technical Field of the Invention

The present invention relates to a resin composition having a light diffusing property. More specifically, the present invention relates to a resin composition comprising a light diffusing agent, an ultraviolet absorber and a phosphor. Further, the present invention relates to a molded article obtained by molding this resin composition.

2. Description of Related Art

Resin compositions such as a methyl methacrylate resin containing a light diffusing agent and the like are widely used as materials of light diffusible members such as a lighting cover, illumination sign board and light diffusing plate for transmission-type display. Recently, in the fields of illumination and transmission-type display, energy saving has progressed, and those providing excellent diffusion and transmittance of light are required as the above-mentioned light diffusible member. On the other hand, high brilliance of a light source lamp has also progressed, and those showing excellent durability are required as the above-mentioned light diffusible member.

Conventionally, there are many proposals regarding resin compositions such as a methyl methacrylate resin containing a light diffusing agent and the like, however, any of them is not necessarily satisfactory in light diffusion and transmittance and durability, and a problem of yellowing of transmitted light occurs in some cases.

Though there are technologies of adding benzotriazole-based or benzophenone-based ultraviolet absorbers to improving durability, when added in large amount for enhancing durability, transmitted light or reflected light is resultantly yellowed, and when a phosphor is further added for improving the yellow color, the above-mentioned ultraviolet absorber absorbs ultraviolet ray around 370 nm necessary for light excitation of the phosphor and an effect cannot be manifested.

SUMMARY OF THE INVENTION

An object of the present invention is to solve the above-mentioned problems and to provide a resin composition used as a material of a light diffusible member, showing excellent in light diffusion and transmission, having excellent durability and suppressing yellowing of transmitted light.

The present inventors have intensively studied, and resultantly found that a resin composition comprising a light diffusing agent, ultraviolet absorber as described herein and phosphor in the amounts respectively as described herein can attain the above-mentioned object, leading to completion of the present invention.

Namely, the present invention provides a resin composition comprising 100 parts by weight of a methyl methacrylate resin or styrene resin, about 0.1 to about 20 parts by weight of a light diffusing agent, about 0.0005 to about 0.1 parts by weight of an ultraviolet absorber selected from the group consisting of 2-(1-arylalkylidene) malonates and oxalanilides, and about 0.0001 to about 0.01 parts by weight of a phosphor.

Also, the present invention provides a molded article made of this resin composition, having a thickness of about 0.8 to about 5 mm and having a content of the light diffusing agent of about 1 to about 500 $g/m^2$, a content of the ultraviolet absorber selected from the group consisting of 2-(1-arylalkylidene) malonates and oxalanilides of about 0.02 to about 3 $g/m^2$ and a content of the phosphor of about 0.001 to about 0.3 $g/m^2$.

Further, the present invention provides a laminated plate obtained by integrally laminating a resin layer (B) made of a resin composition comprising 100 parts by weight of a methyl methacrylate resin or styrene resin and about 0.01 to about 3 parts by weight of an ultraviolet absorber selected from the group consisting of 2-(1-arylalkylidene) malonates and oxalanilides, on at least one surface of a resin layer (A) made of the above-mentioned resin composition.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

DETAILED DESCRIPTION OF THE INVENTION

In the present invention, the methyl methacrylate resin is a polymer containing 50% by weight or more of methyl methacrylate as a monomer constituting the resin, and mentioned are polymethyl methacrylate which is substantially a homopolymer of methyl methacrylate, and copolymers comprising 50% by weight or more of methyl methacrylate and less than 50% by weight of an unsaturated monomer copolymerizable therewith.

As the unsaturated monomer copolymerizable with methyl methacrylate, there are mentioned, for example, methacrylates such as ethyl methacrylate, butyl methacrylate, cyclohexyl methacrylate, phenyl methacrylate, benzyl methacrylate, 2-ethylhexyl methacrylate and 2-hydroxyethyl methacrylate; acrylates such as methyl acrylate, ethyl acrylate, butyl acrylate, cyclohexyl acrylate, phenyl acrylate, benzyl acrylate, 2-ethylhexyl acrylate and 2-hydroxyethyl acrylate; unsaturated acids such as methacrylic acid and acrylic acid; styrene, α-methylstyrene, acrylonitrile, methacrylonitrile, maleic anhydride, phenylmaleimide, cyclohexylmaleimide and the like, and if necessary, two or more of them can be used. Further, the above-mentioned copolymer may have glutaric anhydride unit and glutarimide unit.

The styrene resin is a polymer containing 50% by weight or more of styrene as a monomer constituting the resin, and mentioned are polystyrene which is substantially a homopolymer of styrene, and copolymers comprising 50% by weight or more of styrene and less than 50% by weight of an unsaturated monomer copolymerizable therewith.

As the unsaturated monomer copolymerizable with styrene, the above-mentioned monomers excepting styrene are listed in addition to methyl methacrylate.

The resin composition of the present invention comprises about 0.1 to about 20 parts by weight, preferably about 0.3 to about 15 parts by weight, further preferably about 1 to about 10 parts by weight of a light diffusing agent based on 100 parts by weight of a methyl methacrylate resin or styrene resin. When the content is less than about 0.1 parts by weight, a light diffusing property is not sufficient, and when over about 20 parts by weight, strength is not sufficient.

The particle size of the light diffusing agent, in terms of the weight-average particle size, is preferably about 1 μm or more from the standpoint of a hiding property, and about 30 μm or less, preferably about 20 μm or less from the standpoints of strength and appearance.

As the light diffusing agent, there are usually used inorganic or organic transparent fine particles having a different refractive index from that of the methyl methacrylate resin or styrene resin which is a base material. Regarding the difference between the refractive index of the light diffusing agent and the refractive index of the base material, the absolute value thereof is preferably about 0.02 or more from the standpoint of a light diffusing property, and preferably about 0.13 or less from the standpoint of light transmission. In the present invention, by making a difference in refractive index between the light diffusing agent and base material, a so-called internal diffusible property can be imparted, and a so-called external diffusible property can also be imparted by forming surface unevenness by allowing the light diffusing agent to extrude on the surface of the base material.

As the inorganic light diffusing agent, there are listed, for example, calcium carbonate, barium sulfate, titanium oxide, aluminum hydroxide, silica, glass, talk, mica, white carbon, magnesium oxide, zinc oxide and the like, and these may be surface-treated by a fatty acid and the like. As the organic light diffusing agent, there are listed, for example, styrene polymer particles, acrylic polymer particles, siloxane polymer particles and the like are listed, and higher molecular weight polymer particles having weight-average molecular weights of 500,000 to 5,000,000, and cross-linked polymer particles showing gel fractions of about 10% or more when dissolved in acetone, are suitably used. These light diffusing agents can also be used in combination of two or more, if necessary.

As the styrene polymer particle, used are polymer particles containing 50% by weight or more of a styrene-based monomer having in one molecule one radical-polymerizable double bond, as a constituent monomer (hereinafter, a monomer having one radical-polymerizable double bond in one molecule is called a mono-functional monomer, and a monomer having at least two radical-polymerizable double bonds in one molecule is called a poly-functional monomer, in some cases), and there are used, for example, higher molecular weight polymer particles obtained by polymerizing a styrene-based mono-functional monomer; higher molecular weight polymer particles obtained by polymerizing a styrene-based mono-functional monomer and other mono-functional monomer; cross-linked polymer particles obtained by polymerizing a styrene-based mono-functional monomer and a poly-functional monomer; cross-linked polymer particles obtained by polymerizing a styrene-based mono-functional monomer, other mono-functional monomer and a poly-functional monomer; and the like. As the polymerization method for obtaining these styrene polymer particles, a suspension polymerization method, micro suspension polymerization method, emulsion polymerization method, dispersion polymerization method and the like are usually adopted.

As the styrene-based mono-functional monomer in the styrene polymer particle, halogenated styrenes such as chlorostyrene and bromostyrene, alkylstyrenes such as vinyltoluene and α-methylstyrene, and the like are listed, in addition to styene, and if necessary, two or more of them can also be used.

As the mono-functional monomer other than the styrene-based mono-functional monomer in the styrene polymer particle, there are listed, for example, methacrylates such as methyl methacrylate, ethyl methacrylate, butyl methacrylate, cyclohexyl methacrylate, phenyl methacrylate, benzyl methacrylate, 2-ethylhexyl methacrylate and 2-hydroxyethyl methacrylate; acrylates such as methyl acrylate, ethyl acrylate, butyl acrylate, cyclohexyl acrylate, phenyl acrylate, benzyl acrylate, 2-ethylhexyl acrylate and 2-hydroxyethyl acrylate; acrylonitrile, and the like, and if necessary, two or more of them can also be used. Of them, methacrylates such as methyl methacrylate are preferable.

As the poly-functional monomer in the styrene polymer particle, there are listed, for example, di or more methacrylates of poly-hydric alcohols such as 1,4-butanediol dimethacrylate, neopentyl glycol dimethacrylate, ethylene glycol dimethacrylate, diethylene glycol dimethacrylate, tetraethylene glycol dimethacrylate, propylene glycol dimethacrylate, tetrapropylene glycol dimethacrylate, trimethylolpropane trimethacrylate and pentaerythritol tetramethacrylate; di or more acrylates of poly-hydric alcohols such as 1,4-butanediol diacrylate, neopentyl glycol diacrylate, ethylene glycol diacrylate, diethylene glycol diacrylate, tetraethylene glycol diacrylate, propylene glycol diacrylate, tetrapropylene glycol diacrylate, trimethylolpropane triacrylate and pentaerythritol tetraacrylate; aromatic poly-functional monomers such as divinylbenzene and diallyl phthalate, and the like, and if necessary, two or more of them can also be used.

The refractive index of the styrene polymer particle is, though it depends on constituent components, usually from about 1.53 to about 1.61. Generally, when the content of a monomer having a phenyl group is higher and when the content of a monomer having a halogen group is higher, as the constituent monomer, refractive index tends to increase.

As the acrylic polymer particle, used are polymer particles containing 50% by weight or more of an acrylic mono-functional monomer as a constituent monomer, and there are used, for example, higher molecular weight polymer particles obtained by polymerizing an acrylic mono-functional monomer; higher molecular weight polymer particles obtained by polymerizing an acrylic mono-functional monomer and other mono-functional monomer; cross-linked polymer particles obtained by polymerizing an acrylic mono-functional monomer and a poly-functional monomer; cross-linked polymer particles obtained by polymerizing an acrylic mono-functional monomer, other mono-functional monomer and a poly-functional monomer; and the like. As the polymerization method for obtaining these acrylic polymer particles, a suspension polymerization method, micro suspension polymerization method, emulsion polymerization method, dispersion polymerization method and the like are usually adopted.

As the acrylic mono-functional monomer in the acrylic polymer particle, there are listed, for example, methacrylates such as methyl methacrylate, ethyl methacrylate, butyl methacrylate, cyclohexyl methacrylate, phenyl methacrylate, benzyl methacrylate, 2-ethylhexyl methacrylate and 2-hydroxyethyl methacrylate; acrylates such as methyl acrylate, ethyl acrylate, butyl acrylate, cyclohexyl acrylate, phenyl acrylate, benzyl acrylate, 2-ethylhexyl acrylate and 2-hydroxyethyl acrylate; methacrylic acid, acrylic acid, and the like, and if necessary, two or more of them can also be used.

As the mono-functional monomer other than the acrylic mono-functional monomer in the acrylic polymer particle, there are listed the same styrene-based mono-functional monomers in the above-mentioned styrene polymer particle, and acrylonitrile and the like, and if necessary, two or more of them can also be used. Of them, styrene is preferable. As the poly-functional monomer in the acrylic polymer particle, there are listed the same poly-functional monomers in the above-mentioned styrene polymer particle, and if necessary, two or more of them can also be used.

The refractive index of the acrylic polymer particle, though it depends on constituent components, usually from about 1.46 to about 1.55. Like in the case of the styrene polymer particle, there is generally a tendency that when the content of a phenyl group is higher and when the content of a halogen group is higher, refractive index increases.

As the siloxane polymer particle, there are used those generally called silicone rubber and those called silicone resin and which are solid at ordinary temperature. The siloxane polymer can be produced by hydrolyzing and condensing chlorosilanes such as dimethyldichlorosilane, diphenyldichlorosilane, phenylmethyldichlorosilane, methyltrichlorosilane, phenyltrichlorosilane. Thus obtained polymer may further be cross-linked by acting peroxides such as benzoyl peroxide, 2,4-dichlorobenzoyl peroxide, p-chlorobenzoyl peroxide, dicumyl peroxide, di-t-butyl peroxide, 2,5-dimethyl-2,5-di(t-butylperoxy)hexane, or, one having a silanol group at the end may be condensed and cross-linked with alkoxysilanes. As this polymer, cross-linked polymers having two or three organic groups bonded to one silicon atom are preferable.

The siloxane polymer particle may be obtained by finely grinding a siloxane polymer mechanically, and in production thereof, a curable polymer having a linear organosiloxane block or a composition thereof may be hardened in spray condition to obtain spherical particles as described in JP-A-59-68333, or an alkyltrialkoxysilane or partial hydrolyzed condensate thereof may be hydrolyzed and condensed in an aqueous solution of ammonia or amines to obtain spherical particles as described in JP-A-60-13813.

The refractive index of the siloxane polymer particle is, though it depends on constituent components, usually from about 1.40 to about 1.47. Generally, when the content of a phenyl group is higher and when the content of organic groups bonded directly to a silicon atom is higher, refractive index tends to increase.

The resin composition of the present invention comprises about 0.0005 to about 0.1 parts by weight, preferably about 0.003 to about 0.05 parts by weight, further preferably about 0.005 to about 0.03 parts by weight of an ultraviolet absorber selected from the group consisting of 2-(1-arylalkylidene) malonates and oxalanilides based on 100 parts by weight of a methyl methacrylate resin or styrene resin. When the content is less than about 0.0005 parts by weight, durability is not sufficient, and when over about 0.1 part by weight, this ultraviolet absorber tends to bleed, and handling in molding is not sufficient.

As the 2-(1-arylalkylidene) malonates, compounds of the following general formula (1) are preferable from the standpoint of durability;

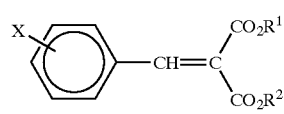

(1)

wherein, X represents a hydrogen atom, alkyl group having 1 to about 6 carbon atoms or alkoxy group having 1 to about 6 carbon atoms, and $R^1$ and $R^2$ each independently represent an alkyl group having 1 to about 6 carbon atoms.

In the general formula (1), the alkyl group or the alkyl group in the alkoxy group represented by X may be each linear or branched group, and for example, a methyl group, ethyl group, n-propyl group, isopropyl group, n-butyl group, isobutyl group, sec-butyl group, tert-butyl group and the like are listed. X represents preferably a hydrogen atom, alkyl group having 1 to about 4 carbon atoms or alkoxy group having 1 to about 4 carbon atoms, and the substitution position of X is preferably para-position.

In the general formula (1), the alkyl groups represented by $R^1$ and $R^2$ may be each linear or branched group, and for example, a methyl group, ethyl group, n-propyl group, isopropyl group, n-butyl group, isobutyl group, sec-butyl group, tert-butyl group and the like are listed. It is preferable that $R^1$ and $R^2$ each represent an alkyl group having 1 to about 4 carbon atoms.

As the oxalanilides, compounds of the following general formula (2) are preferable from the standpoint of durability;

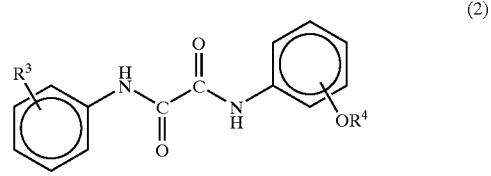

(2)

wherein, $R^3$ and $R^4$ each independently represent an alkyl group having 1 to about 6 carbon atoms.

In the general formula (2), the alkyl groups represented by $R^3$ and $R^4$ may be each linear or branched group, and for example, a methyl group, ethyl group, n-propyl group, isopropyl group, n-butyl group, isobutyl group, sec-butyl group, tert-butyl group and the like are listed. It is preferable that $R^3$ and $R^4$ each represent an alkyl group having 1 to about 4 carbon atoms, and preferably the substitution positions of $R^3$ and $R^4O$ are each ortho-position.

The resin composition of the present invention comprises about 0.0001 to about 0.01 parts by weight, preferably about 0.0003 to about 0.005 parts by weight, further preferably about 0.0005 to about 0.003 parts by weight of a phosphor based on 100 parts by weight of a methyl methacrylate resin or styrene resin. When the content is less than about 0.0001 parts by weight, color tone tends to become yellowish, and when over about 0.01 parts by weight, this phosphor tends to bleed, handling in molding is not sufficient, further, color tone becomes yellowish.

Here, the phosphor is one excited by ultraviolet ray to emit visible light, and generally called also as a fluorescent pigment, fluorescent dye, fluorescent white dye, fluorescent whitening agent, fluorescent bleach or the like. As the phosphor, for example, fluorescein, thioflavine, eosine, rhodamine, derivatives thereof, coumarins, imidazoles, oxazoles, triazoles, carbazoles, pyridines, naphthalic acids, imidazolones, diaminostylbenzsulfonic acids and the like are listed, and if necessary, two or more of them can also be used.

The resin composition of the present invention may contain hindered amines such as compounds having a 2,2, 6,6-tetraalkylpyperidine skeleton, for further improving durability. In this case, the content of hindered amines is usually about 0.0001 or more parts by weight, preferably about 0.001 or more parts by weight, further preferably about 0.003 or more parts by weight based on 100 parts by weight of the methyl methacrylate resin or styrene resin, and from the standpoints of cost and transparency, usually about 0.1 parts by weight or less, preferably 0.05 parts by weight, further preferably 0.03 parts by weight. The content of the hindered amines is usually about 100 parts by weight or less, preferably in the range of about 10 to about 80 parts by weight based on 100 parts by weight of an ultraviolet absorber selected from the group consisting of 2-(1-arylalkylidene) malonates and oxalanilides.

Hindered amines, there are listed, for example, polycondensate of dimethyl succinate and 1-(2-hydroxyethyl)-4-hydroxy-2,2,6,6-tetramethylpypedirine polycondensate, poly((6-(1,1,3,3-tetramethylbutyl)imino-1,3,5-triazine-2,4-diyl)((2,2,6,6-tetramethyl-4-piperidyl)imino) hexamethylene((2,2,6,6-tetramethyl-4-piperidyl)imino)), bis(1,2,2,6,6-pentamethyl-4-pyperidyl)2-(2,3-di-t-butyl-4-hydroxybenzyl)-2-n-butylmalonate, bis(1,2,2,6,6-pentamethyl-4-pyperidyl)2-(3,5-di-t-butyl-4-hydroxybenzyl)-2-n-butylmalonate, polycondensate of N,N'-bis(3-aminopropyl)ethylenediamine and 2,4-bis(N-butyl-N-(1,2,2,6,6-pentamethyl-4-pyperidyl)amino)-6-chloro-1,3,5-triazine, bis(2,2,6,6-tetramethyl-4-pyperidyl) sevacate, bis(2,2,6,6-tetramethyl-4-piperidyl) succinate, compounds of the following general formula (3), and if necessary, two or more of them can also be used. Of them, compounds of the following general formula (3) are preferable.

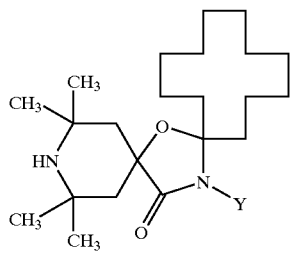

(3)

wherein, Y represents a hydrogen atom, alkyl group having 1 to about 20 carbon atoms, carboxylalkyl group having 2 to about 20 carbon atoms in total, alkoxylalkyl group having 2 to about 25 carbon atoms in total or alkoxylcarbonylalkyl group having 3 to about 25 carbon atoms in total.

In the general formula (3), the alkyl group, carboxylalkyl group, two alkyl group in the alkoxyalkyl group (an alkyl group in the alkoxy group and an alkyl group substituted with the alkoxy group) and two alkyl group in the alkoxycarbonylalkyl group (an alkyl group in the alkoxy group and an alkyl group substituted with the alkoxycarbonyl group) represented by Y may each be linear or branched group. Y represents preferably a hydrogen atom or alkoxycarbonylalkyl group having about 5 to about 24 carbon atoms in total, further preferably a hydrogen atom or alkoxycarbonylethyl group. As the alkoxycarbonylethyl group, for example, a dodecyloxycarbonylethyl group, tetradecyloxycarbonylethyl group, hexadecyloxycarbonylethyl group, octadecyloxycarbonylethyl group and the like are listed.

The resin composition of the present invention can contain various additives, if necessary, in an amount not impairing the object of the invention. As the additives, for example, impact resistant agents such as graft copolymers obtained by graft-polymerizing an ethylenically unsaturated monomer to an acrylic polymer having multi-layer structure or rubber-like polymer; antistatic agents such as sodium alkylsulfonate, sodium alkylsulfate, stearic monoglyceride and polyether ester amide; antioxidants such as hindered phenol; flame retardants such as phosphates; lubricants such as palmitic acid and stearyl alcohol; dyes and the like are listed, and if necessary, two or more of them can also be used.

As the method of preparing the resin composition of the present invention, known methods can be appropriately selected, and for example, the above-mentioned methyl methacrylate resin or styrene resin, light diffusing agent, ultraviolet absorber, phosphor, and if necessary, other components may be mechanically mixed in a Henschel mixer and tumbler and the like, then, melt-kneaded by using a single-screw or twin-screw extruder or various kneaders. Further, monomers constituting the methyl methacrylate resin or partially polymerized syrup thereof can be mixed with a light diffusing agent, ultraviolet absorber, phosphor, and if necessary, other components, and polymerized in continuous or batch-wise mode, to obtain a composition molded in the form of pellet, plate and the like.

The resin composition of the present invention can be made into various molded articles by methods such as extrusion molding, injection molding, press molding and the like. As these molding method, known methods can be appropriately selected, and in the case of extrusion molding, for example, the above-mentioned resin composition can be melted using a single-screw or twin-screw extruder, then, extruded via a T die and a roll unit, to obtain a molded article in the form of plate. Further, a laminated molded article in the form of plate having a layer of the above-mentioned resin composition can be obtained by extruding the above-mentioned composition and other materials via a feed block die, multi manifold die and roll unit by using two or more extruders.

Particularly, the resin composition of the present invention is suitably used, in the form of a molded article having a thickness of about 0.8 to about 5 mm, as the material of sign boards, illumination sign boards, show cases, light diffusing plates for transmission-type displays, and the like, and especially used suitably as the material of a light diffusible member constituting a light source apparatus together with a light source, such as illumination signboards, lighting covers, light diffusing plates for transmission-type displays. Here, as the light diffusing plate for transmission-type display, a light diffusing plate in back light of a liquid crystal display is typical, and the back light may be of right below-type or of edge light-type. As the light source of the back light, a LED light source and a cold cathode fluorescent lamp and the like are used.

In the molded article having a thickness of about 0.8 to about 5 mm, it is preferable that the content of the light diffusing agent is about 1 to about 500 g/m$^2$, the content of the ultraviolet absorber selected from the group consisting of 2-(1-arylalkylidene) malonates and oxalanilides is about 0.02 to about 3 g/m$^2$ and the content of the phosphor is about 0.001 to about 3 g/m$^2$.

In recent light diffusible articles, the surface of a molded article is often in matted condition as typified by a lighting cover, and also in the molded article of the present invention, matting is sufficiently possible.

For attaining matting, insoluble resin particles having specific size are uniformly dispersed in specific amount in a resin composition and the mixed resin composition is extruded, or unevenness is transferred to the article extruded by a roller, in extrusion molding, and unevenness is cell-transferred to the surface of the article, in casting polymerization.

The insoluble resin particle herein is a resin particle similar to the resin composition dispersing the above-mentioned resin particle, and specifically, when the resin composition is made of a methyl methacrylate resin, is a cross-linked or higher molecular weight methyl methacrylate resin particle, and when the resin layer is made of a styrene resin, is a cross-linked or higher molecular weight styrene resin particle.

Here, when the composition of the resin composition and the composition of the insoluble resin particle differ significantly, there is a possibility of decrease in surface impact, therefore combination thereof should be noticed.

Unevenness applied on the surface of a molded article is desirably less than about 50 $\mu$m in terms of 10 points average roughness (Rz) described in JIS-B0601. In the case of dispersing insoluble resin particles, the above-mentioned unevenness level is attained after extrusion molding, if particles having a weight-average particle size of about 1 to about 50 $\mu$m are dispersed uniformly in an amount of about 3 to about 20 parts by weight based on 100 parts by weight of the resin composition.

If the 10 points average roughness is over about 50 $\mu$m, a molded article tends to be cracked because of the notch effect when load is applied on the surface. Also when the particle size and molecular weight of the insoluble resin particles are over the above-mentioned value ranges, surface impact decreases.

The laminated plate of the present invention is obtained by integrally laminating a resin layer (B) made of a resin composition comprising 100 parts by weight of a methyl methacrylate resin or styrene resin and about 0.01 to about 3 parts by weight of an ultraviolet absorber selected from the group consisting of 2-(1-arylalkylidene) malonates and oxalanilides, on at least one surface of a resin layer (A) made of the resin composition comprising 100 parts by weight of a methyl methacrylate resin or styrene resin, about 0.1 to about 20 parts by weight of a light diffusing agent, about 0.0005 to about 0.1 parts by weight of an ultraviolet absorber selected from the group consisting of 2-(1-arylalkylidene) malonates and oxalanilides and about 0.0001 to about 0.01 parts by weight of a phosphor.

The ultraviolet absorber selected from the group consisting of 2-(1-arylalkylidene) malonates and oxalanilides in the resin composition constituting the resin layer (B) is the same as the above-mentioned ultraviolet absorber, and the content thereof is from about 0.01 to about 3 parts by weight, preferably from about 0.05 to about 2 parts by weight, further preferably from about 0.1 to about 1 parts by weight based on 100 parts by weight of a methyl methacrylate resin or styrene resin. When the content is less than about 0.01 parts by weight, durability is deficient, and when over about 3 parts by weight, bleeding tends to occur on the surface of alaminated plate, and appearance may be impaired in some cases.

The resin composition constituting the resin layer (B) can contain, like the resin composition constituting the resin layer (A), additives such as hindered amines and impact resistant agents, antistatic agents and the like, if necessary, in an amount not impairing the object of the present invention.

The resin composition constituting the resin layer (B) is also obtained, like the resin composition constituting the resin layer (A), by mechanical mixing by a Henschel mixer, tumbler and the like, then, melt kneading by a Banbury mixer, or a single-screw or twin-screw extruder. Further, it is also possible to make a laminated plate in a single step using a co-extrusion molding method and cast polymerization method described later.

The thickness of the laminated plate in the present invention is not particularly restricted, and generally in the range from about 0.8 to about 5 mm.

The layer thickness ratio (resin layer (A)/resin layer (B)) lies within the range from about 99/1 to about 1.1/1. When the resin layer (B) is coated on both surfaces of the resin layer (A), the layer thickness ratio (resin layer (B)/resin layer (A)/resin layer (B)) lies within the range from about 1/198/1 to about 1/2.2/1.

From the standpoint of durability, an embodiment in which the resin layer (B) is coated on both surfaces of the resin layer (A) is preferable, and from the standpoints of cost and durability, it is preferable that the total layer thickness of the resin layer (B) is about ½ or less of the layer thickness of the resin layer (A).

For making the resulted composition into a laminated plate, known methods are used. For example, a co-extrusion molding method, pasting method, heat adhesion method, solvent adhesion method, polymerization adhesion method, cast polymerization method, surface coating method and the like are used.

The co-extrusion molding method is a method in which compositions of the resin layer (A) and the resin layer (B) are melt-kneaded by two or three single-screw or twin-screw extruders, then, the compositions are laminated via a feed block die or multi manifold die, and wherein, the integrally laminated melt resin plate is cooled to solidify using a roll unit.

The pasting method is a method in which one of compositions is processed into a sheet or film and another composition is subjected to extrusion molding to give a resin layer in melted condition, and both layers are superposed and pressed to past thereof.

The heat adhesion method is a method in which the compositions of both layers are previously processed into sheets or films, and pressed at temperatures higher than the softening points of both layers for integration thereof.

The solvent adhesion method is a method in which both compositions are processed into sheets or films and adhesion is imparted to the surfaces of the layers by a solvent dissolving either any one layer or both layers, and they are adhered for integration.

In the polymerization adhesion method, a polymerization adhesive prepared by adding a polymerization initiator initiating radical polymerization by heat or light to a monomer or partial polymer which is a raw material of any of resins constituting both layers is allowed to intervene between both layers, and heating or light irradiation is conducted to cause polymerization and simultaneously integral lamination.

The cast polymerization method is a method in which one layer is previously made in the form of sheet or film, this is placed on one surface of a cell for cast molding, and a mixture of a monomer or partial polymer forming another layer and an ultraviolet absorber and the like as required is injected into this cell and polymerized.

The surface coating method is a method in which a sheet or film of a layer having larger thickness is previously made, and a mixture of a monomer or partial polymer forming another layer and additives as required is applied onto the sheet or film and polymerized to solidify by heating or irradiation with ultraviolet ray.

EXAMPLES

The following examples illustrate the present invention further in detail, but do not limit the scope of the invention.

The extrusion apparatuses used in the examples are as described below.

Extruder I: screw diameter: 40 mm, single-screw, with bent (manufactured by Tanabe Plastic K.K.)

Extruder II: screw diameter: 20 mm, single-screw, with bent (manufactured by Tanabe Plastic K.K.)

Feed block: two kinds three layers distribution (manufactured by Tanabe Plastic K.K.)

Die: T die, lip width: 250 mm, lip interval: 6 mm

Roll: three polishing rolls, longitudinal type

Evaluation of the physical properties of a resin plate was conducted according to the following methods.

(1) Weight-average Particle Size

Particle sizes were measured by a light diffraction scattering particle size measuring machine (manufactured by Nikkiso Co., Ltd., micro track particle size analyzer: Model 9220 FRA), and the $D_{50}$ value was used as an average particle size.

(2) Total Light Transmittance (Tt)

It was measured by a haze-transmittance meter (HR-100, manufactured by Murakami Shikisai Gijutsu Kenkyusho) according to JIS K-7361.

(3) Hiding Property and Light Diffusible Property

The strength of the transmitted light by vertical incident light at a transmission angle of 0° ($I_0$), the strength of the transmitted light by vertical incident light at a transmission angle of 5° ($I_5$), and the strength of the transmitted light by vertical incident light at a transmission angle of 70° ($I_{70}$) were measured using GP-1R (manufactured by Murakami Shikisai Gijutsu Kenkyusho), and $I_5/I_0$ was used as a hiding property and $I_{70}/I_0$ was used as light diffusible property.

(4) Average Brilliance

1. Average brilliance of single plate

Five cold cathode fluorescent lamps of 3 mm φ were arranged at an interval of 3 cm on a reflecting sheet, and a resin plate was placed in parallel at a position 14 mm above it. The cold cathode fluorescent lamps were lighted, and the brilliance at 90 cm above the resin plate was measured by using a multi point brilliance meter (manufactured by Cannon Inc.), and the average value of 36 points (12 (direction crossing the cold cathode fluorescent lamp)×3 (direction parallel to the cold cathode fluorescent lamp)) in the range of center three tubes of five cold cathode fluorescent lamps was calculated.

2. Average brilliance of laminated plate

Nine cold cathode fluorescent lamps of 3 mm φ were arranged at an interval of 3 cm on a reflecting sheet, and a resin plate (size: 400×300) was placed in parallel at a position 14 mm above it. The cold cathode fluorescent lamps were lighted, and the brilliance at 90 cm above the resin plate was measured by using a multi point brilliance meter (manufactured by Cannon Inc.), and the average value of 441 points (21 (direction crossing the cold cathode fluorescent lamp)×21 (direction parallel to the cold cathode fluorescent lamp)) in the all range was calculated.

(5) Chromaticity

Chromaticity was measured simultaneously with the above-mentioned brilliance measurement, and the following x value and y value were calculated.

x value calculated from CIE-XYZ color system [x=X/(X+Y+Z)]

y value calculated from CIE-XYZ color system [y=Y/(X+Y+Z)]

(6) Durability

In the durability test, a 60 mm×70 mm test piece was continuously irradiated with UV for 350 hours in a 60° C. using ATLAS-UVCON (manufactured by Toyo Seiki K.K.), and change of color tone was checked.

L*, a* and b* of transmitted light and reflected light were measured using a spectral color difference meter, "SZ-Σ80" manufactured Nippon Denshoku Kogyosha K.K. according to JIS-K 7103, and ΔE before and after the test was calculated.

(7) Surface Roughness 10 points average roughness (Rz) and average peak distance (Sm) were measured using a surface roughness and form measuring machine, "Surfcom® 550A" manufactured by Tokyo Seimitsu K.K. according to JIS-B 0601.

Examples 1 and 2

Comparative Example 1

100 parts by weight of a methylmethacrylate resin (copolymer of 94 parts by weight of methyl methacrylate and 6 parts by weight of methyl acrylate, refractive index: 1.49), 6 parts by weight of acrylic polymer particle 1 (copolymer particle of 55 parts by weight of methyl methacrylate, 40 parts by weight of styrene and 5 parts by weight of ethylene glycol dimethacrylate, refractive index: 1.53, weight-average particle size: 5 μm), 2 parts by weight of acrylic polymer particle 2 (copolymer particle of 95 parts by weight of methyl methacrylate and 5 parts by weight of ethylene glycol dimethacrylate, refractive index: 1.49, weight-average particle size: 4 μm), 1.1 parts by weight of calcium carbonate particles (refractive index: 1.61, weight-average particle size: 3.5 μm, manufactured by Maruo Calcium K.K.), 0.8 parts by weight of siloxane-based polymer particles (refractive index: 1.42, weight-average particle size: 2 μm, manufactured by Toray Dow Corning Silicone K.K.), 0.011 parts by weight of dimethyl 2-(p-methoxybenzylidene)malonate (in the general formula (1), X represents a methoxy group and the substitution position thereof is para-position, and $R^1$ and $R^2$ represent a methyl group, manufactured by Clariant, Sanduvor® PR-25) and oxazole-based phosphor (4,4-bis-(5-methyl-2-benzooxazolyl) stilbene, manufactured by Sumitomo Chemical Co., Ltd., White Flow® PSN) in an amount shown in Table 1 were mixed by a Henschel mixer, then, melt kneaded using an extruder, and resin plates having a width of 20 cm and a thickness of 2 mm were manufactured at an extrusion resin temperature of 265° C. The evaluation results of the resulted resin plates are shown in Table 1.

Comparative Example 2

The same procedure as in Comparative Example 1 was conducted excepting that 2-(2-hydroxy-5-methylphenyl)-2H-benzotriazole (manufactured by Sumitomo Chemical Co., Ltd., Sumisorb® 200) was used instead of dimethyl 2-(p-methoxybenzylidene)malonate. The evaluation results of the resulted resin plate are shown in Table 1.

Comparative Example 3

The same procedure as in Example 1 was conducted excepting that 2-(2-hydroxy-5-methylphenyl)-2H-benzotriazole (manufactured by Sumitomo Chemical Co., Ltd., Sumisorb® 200) was used instead of dimethyl 2-(p-methoxybenzylidene)malonate. The evaluation results of the resulted resin plate are shown in Table 1.

TABLE 1

| Example | Ultra-violet absorber * | Oxazole-based phosphor (parts by weight) | Average brilliance (cd/m²) | x value | y value |
|---|---|---|---|---|---|
| Example 1 | Malonate | 0.0015 | 471 | 0.298 | 0.297 |
| Example 2 | Malonate | 0.0030 | 470 | 0.299 | 0.297 |
| Comparative | Malonate | — | 471 | 0.301 | 0.298 |

TABLE 1-continued

| Example | Ultra-violet absorber * | Oxazole-based phosphor (parts by weight) | Average brilliance (cd/m²) | x value | y value |
|---|---|---|---|---|---|
| Comparative example 1 | — | — | 454 | 0.304 | 0.298 |
| Comparative example 2 | Sumisorb ® 200 | — | | | |
| Comparative example 3 | Sumisorb ® 200 | 0.0015 | 465 | 0.300 | 0.297 |

* Malonate: dimethyl 2-(p-methoxybenzilidene)malonate
Sumisorb ® 200: 2-(2-hydroxy-5-methylphenyl)-2H-benzotriazole A difference in average brilliance of 1 cd/m² and a difference in the x value and the y value of 0.001 are significant, and in Comparative Examples 1 and 2, yellowish appearance is observed in lighting since the x value and the y value are larger as compared with Example 1. In Comparative Examples 2 and 3, brightness is deficient since brilliance is lower as compared with Example 1 and 2.

A resin plate showing excellent light diffusing transmittance and manifesting suppressed yellowing of transmitted light is obtained even if oxalanilides corresponding to the general formula (2), for example, 2-ethoxy-2'-ethyloxalanilide [in the general formula (2), $R^3$ and $R^4$ represent an ethyl group, and the substitution positions of $R^3$ and $R^4$ are ortho-position] is used instead of dimethyl 2-(p-methoxybenzylidene)malonate used in Examples 1 and 2.

Examples 3 to 9

Comparative Examples 4 to 6

Resin Layer (A)

100parts by weight of a methyl methacrylate resin [copolymer of 96 parts by weight of methyl methacrylate and 4 parts by weigh of methyl acrylate, refractive index: 1.49] and a light diffusing agent, phosphor and ultraviolet absorber of kinds and in amounts shown in Table 2 were mixed in a Henschel mixer, then, melt kneaded by an extruder I, and fed to a feed block.

Resin Layer (B)

100 parts by weight of the same methyl methacrylate resin as used in the resin layer (A) and an ultraviolet absorber and insoluble resin particles of kinds and in amounts shown in Tables 2-1 and 2-2 were mixed in a Henschel mixer, then, melt kneaded by an extruder II, and fed to a feed block.

Co-extrusion molding was conducted at three layer constitution of 0.05 mm/1.9 mm/0.05 mm at an extrusion resin temperature of 265° C. using the resin layer (A) as an intermediate layer and the resin layer (B) as a surface layer, to manufacture a resin plate having a width of 22 cm.

The evaluation results are shown in Table 3.

Additives used are as shown below.

Light diffusing agent

A-1) Copolymer particle of 55 parts by weight of methyl methacrylate, 40 parts by weigh of styrene and 5 parts by weight of ethylene glycol dimethacrylate, refractive index: 1.53, weight-average particle size: 5 μm A-2) Copolymer particle of 95 parts by weight of styrene and 5 parts by weight of divinylbenzene, refractive index: 1.59, weight-average particle size: 6 μm A-3) Cross-linked siloxane-based particle, "Torayfil® DY33-719" manufactured by Toray Dow Corning Silicone K.K., refractive index: 1.42, weight-average particle size: 2 μm A-4) Calcium carbonate, "CUBE30AS" manufactured by Maruo Calcium K.K., refractive index: 1.61, weight-average particle size: 4 μm Phosphor B-1) 4,4-bis-(5-methyl-2-benzooxazolyl)stilbene, manufactured by Sumitomo Chemical Co., Ltd., "White Flow® PSN"

Ultraviolet absorber

C-1) Dimethyl 2-(p-methoxybenzylidene)malonate [in the general formula (1), X represents a methoxy group and the substitution position thereof is para-position, and $R^1$ and $R^2$ represent a methyl group, manufactured by Clariant, Sanduvor® PR-25]

C-2) 2-(2'-hydroxy-3', 5-di'-t-amylphenyl)-benzotriazole [manufactured by Sumitomo Chemical Co., Ltd., Sumisorb® 350]

Insoluble resin particle

D-1) Copolymer particle of 95 parts by weight of methyl methacrylate and 5 parts by weight of ethylene glycol dimethacrylate, refractive index: 1.49, weight-average particle size: 4 μm D-2) Copolymer particle of 99 parts by weight of methyl methacrylate and 1 part by weight of ethylene glycol dimethacrylate, refractive index: 1.49, weight-average particle size: 35 μm

TABLE 2-1

| | Resin layer A | | | | | |
|---|---|---|---|---|---|---|
| | Light diffusing agent | | Phosphor | | Ultraviolet absorber | |
| | kind | parts by weight | kind | parts by weight | kind | parts by weight |
| Example 3 | A-2 | 0.75 | B-1 | 0.0015 | C-1 | 0.01 |
| | A-3 | 0.75 | | | | |
| Example 4 | A-2 | 0.75 | B-1 | 0.0015 | C-1 | 0.01 |
| | A-3 | 0.75 | | | | |
| Example 5 | A-2 | 1.50 | B-1 | 0.0015 | C-1 | 0.01 |
| | A-3 | 0.75 | | | | |
| Example 6 | A-3 | 0.75 | B-1 | 0.0015 | C-1 | 0.01 |
| | A-4 | 0.75 | | | | |
| Example 7 | A-3 | 0.50 | B-1 | 0.0015 | C-1 | 0.01 |
| | A-4 | 1.25 | | | | |
| Example 8 | A-2 | 0.75 | B-1 | 0.0015 | C-1 | 0.01 |
| | A-3 | 0.75 | | | | |
| Example 9 | A-2 | 0.75 | B-1 | 0.0015 | C-1 | 0.01 |
| | A-3 | 0.75 | | | | |
| Comparative example 4 | A-2 | 0.75 | B-1 | 0.0015 | C-1 | 0.01 |
| | A-3 | 0.75 | | | | |
| Comparative example 5 | A-2 | 0.75 | — | — | C-1 | 0.01 |
| | A-3 | 0.75 | | | | |
| Comparative example 6 | A-2 | 0.75 | B-1 | 0.0015 | C-1 | 0.01 |
| | A-3 | 0.75 | | | | |

TABLE 2-2

| | Resin layer B | | | |
|---|---|---|---|---|
| | Ultraviolet absorber | | Insoluble resin particle | |
| | kind | parts by weight | kind | parts by weight |
| Example 3 | C-1 | 1.00 | D-1 | 8 |
| Example 4 | C-1 | 0.03 | D-1 | 8 |
| Example 5 | C-1 | 0.03 | D-1 | 8 |
| Example 6 | C-1 | 0.03 | D-1 | 8 |
| Example 7 | C-1 | 0.03 | D-1 | 8 |
| Example 8 | C-1 | 0.03 | D-2 | 8 |
| Example 9 | C-1 | 0.50 | — | — |

TABLE 2-2-continued

| | Resin layer B | | | |
|---|---|---|---|---|
| | Ultraviolet absorber | | Insoluble resin particle | |
| | kind | parts by weight | kind | parts by weight |
| Comparative example 4 | — | — | D-1 | 8 |
| Comparative example 5 | C-1 | 0.03 | D-1 | 8 |
| Comparative example 6 | C-2 | 1.00 | — | — |

TABLE 3-1

| | Tt % | $I_5/I_0$ | $I_{70}/I_0$ | Average brilliance cd/m² |
|---|---|---|---|---|
| Example 3 | 64.2 | 99.7 | 20.3 | 418 |
| Example 4 | 67.3 | 98.8 | 16.3 | 419 |
| Example 5 | 64.6 | 99.1 | 18.3 | 416 |
| Example 6 | 63.2 | 99.5 | 21.5 | 415 |
| Example 7 | 64.2 | 97.8 | 20.8 | 415 |
| Example 8 | 63.7 | 99.8 | 20.4 | 417 |
| Example 9 | 64.8 | 99.0 | 19.3 | 412 |
| Comparative example 4 | 64.4 | 98.8 | 20.6 | 417 |
| Comparative example 5 | 63.4 | 98.9 | 20.4 | 416 |
| Comparative example 6 | 64.1 | 99.0 | 19.4 | 413 |

TABLE 3-2

| | Average chromaticity x | Average chromaticity y | ΔE transmission/ reflection | Surface roughness Rz/Sm (μm) |
|---|---|---|---|---|
| Example 3 | 0.2973 | 0.3006 | 0.9/2.1 | 2.4/45 |
| Example 4 | 0.2972 | 0.3006 | 2.7/5.6 | 3.0/39 |
| Example 5 | 0.2973 | 0.3005 | 2.4/5.0 | 3.0/32 |
| Example 6 | 0.2973 | 0.3003 | 2.1/4.5 | 3.1/38 |
| Example 7 | 0.2973 | 0.3004 | 3.9/8.2 | 2.9/35 |
| Example 8 | 0.2970 | 0.3002 | 4.8/9.7 | 9.0/161 |
| Example 9 | 0.2970 | 0.3003 | 1.0/2.5 | —/— |
| Comparative example 4 | 0.2972 | 0.3006 | 6.4/12.7 | 2.8/42 |
| Comparative example 5 | 0.2981 | 0.3010 | 4.5/9.4 | 2.3/65 |
| Comparative example 6 | 0.2978 | 0.3012 | 0.4/0.6 | —/— |

A resin plate showing excellent light diffusing transmittance and manifesting suppressed yellowing is obtained even if oxalanilides corresponding to the general formula (2), for example, 2-ethoxy-2'-ethyloxalanilide [in the general formula (2), $R^3$ and $R^4$ represent an ethyl group, and the substitution positions of $R^3$ and $R^4$ are ortho-position] is used instead of dimethyl 2-(p-methoxybenzylidene) malonate used in Examples 3 to 9.

The present invention can obtain a methyl methacrylate resin composition which is used as a material of a light diffusing member showing excellent light diffusible transmittance, having excellent durability and manifesting suppressed yellowing of transmitted light. A molded article obtained by molding this composition can be suitably used as a light diffusing plate for transmission type displays. Further, the laminated plate of the present invention is suitably used as a lighting cover, light diffusing plate for liquid crystal displays, illumination sign board or the like for which light transmittance and light diffusing property are required and durability is desired.

The invention being thus described, it will be obvious that the same may be varied in many ways. Such variations are not to be regarded as a departure from the sprit and scope of the invention, and such modifications as would be obvious to one skilled in the art are intended to be included within the scope of the following claims.

What is claimed is:

1. A resin composition comprising 100 parts by weight of a methyl methacrylate resin or styrene resin, about 0.1 to about 20 parts by weight of a light diffusing agent, about 0.0005 to about 0.1 parts by weight of an ultraviolet absorber selected from the group consisting of 2-(1-arylalkylidene) malonates and oxalanilides, and about 0.0001 to about 0.01 parts by weight of a phosphor.

2. The resin composition according to claim 1, wherein the light diffusing agent has a weight-average particle size of about 1 to about 30 μm.

3. A molded article made of the resin composition according to claim 1, having a thickness of about 0.8 to about 5 mm and having a content of the light diffusing agent of about 1 to about 500 g/m², a content of the ultraviolet absorber selected from the group consisting of 2-(1-arylalkylidene) malonates and oxalanilides of 0.02 to 3 g/m² and a content of the phosphor of about 0.001 to about 0.3 g/m².

4. A laminated plate obtained by integrally laminating a resin layer (B) made of a resin composition comprising 100 parts by weight of a methyl methacrylate resin or styrene resin and about 0.01 to about 3 parts by weight of an ultraviolet absorber selected from the group consisting of 2-(1-arylalkylidene) malonates and oxalanilides, on at least one surface of a resin layer (A) made of the resin composition according to claim 1.

5. The laminated plate according to claim 4, wherein the total thickness is about 0.8 to about 5 mm, the resin layer (B) is laminated on both surfaces of the resin layer (A) to give a three-layer structure, and the total thickness of the resin layer (B) is about ½ or less of the thickness of the resin layer (A).

* * * * *